Sept. 19, 1961  M. TRUBERT  3,000,570
THERMOSTATIC FLUID MIXING COCK
Filed Aug. 29, 1958  2 Sheets-Sheet 1
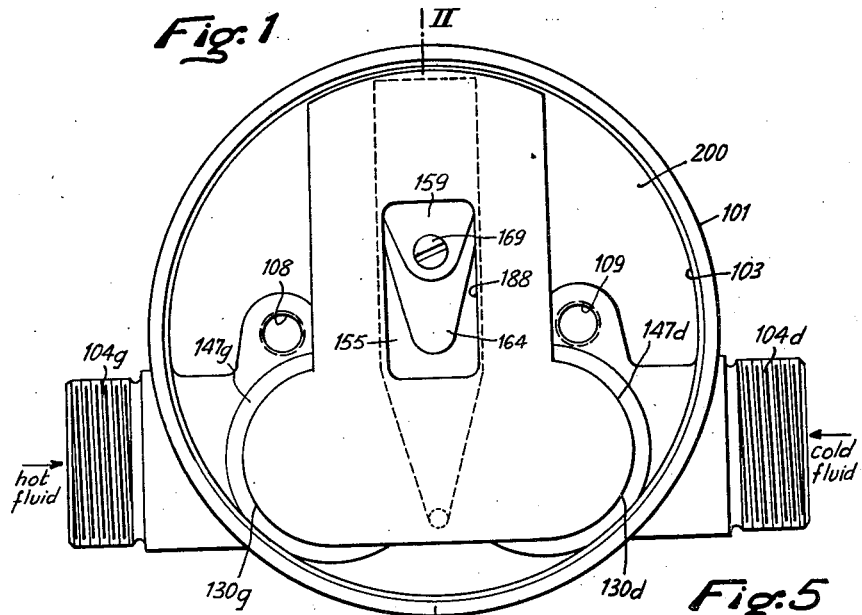
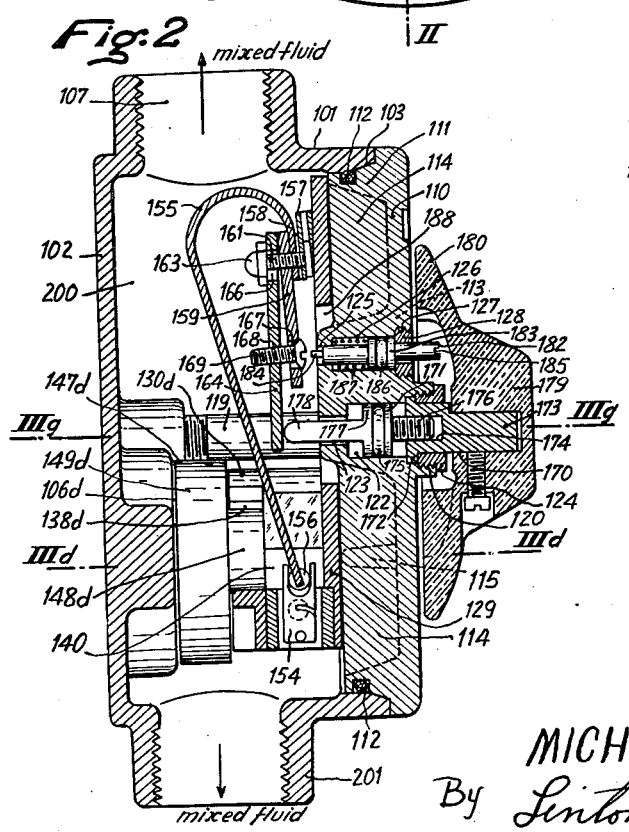
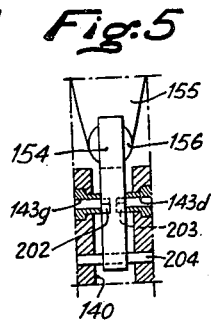
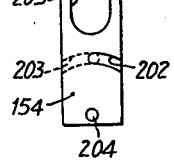
INVENTOR
MICHEL TRUBERT
By Linton and Linton
ATTORNEYS Sept. 19, 1961 M. TRUBERT 3,000,570
THERMOSTATIC FLUID MIXING COCK
Filed Aug. 29, 1958 2 Sheets-Sheet 2
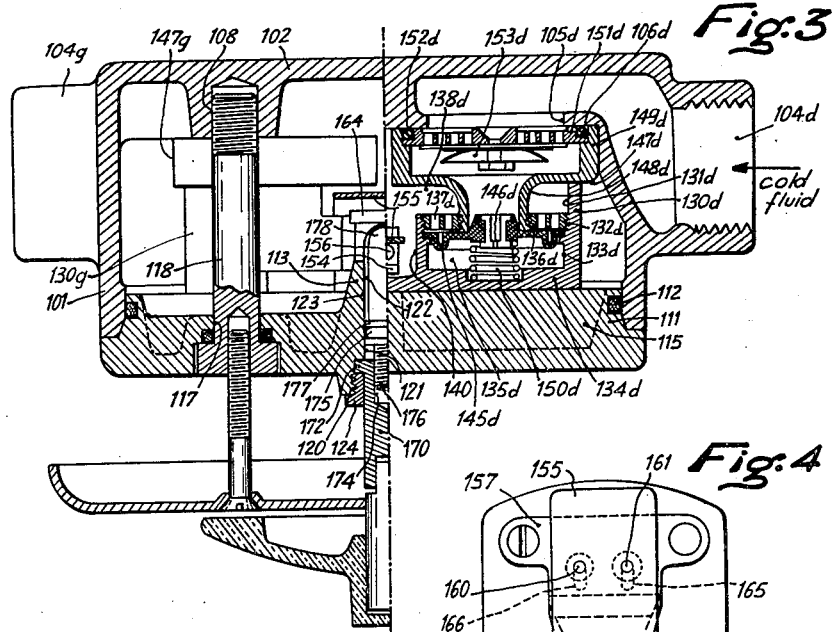
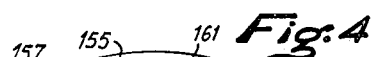
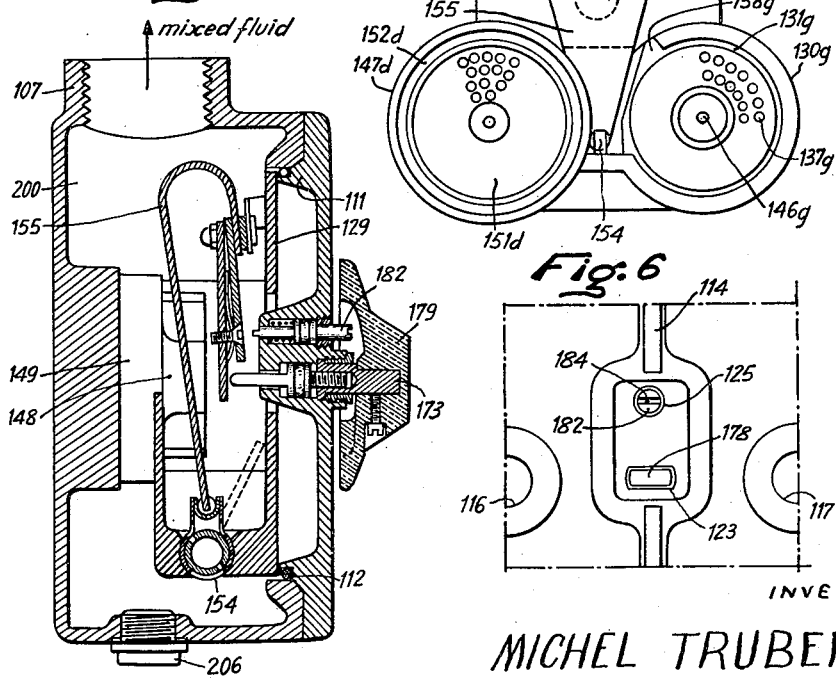
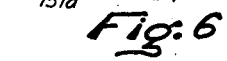
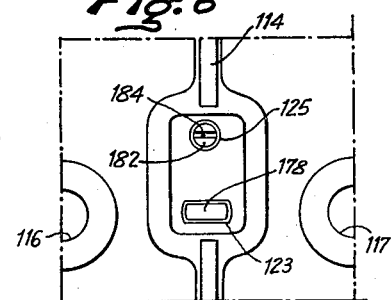
INVENTOR
MICHEL TRUBERT
By Linton and Linton
ATTORNEYS United States Patent Office 3,000,570
Patented Sept. 19, 1961

3,000,570
THERMOSTATIC FLUID MIXING COCK
Michel Trubert, 8 Ave. du General-Gouraud,
Viroflay, France
Filed Aug. 29, 1958, Ser. No. 758,116
Claims priority, application France Sept. 6, 1957
5 Claims. (Cl. 236—12)

This invention relates to apparatus of the type comprising a mechanism adapted to more or less open or close a fluid-control valve responsive to the action of a thermostatic bimetallic strip, the operating temperature of this strip being adjustable by means of adjustment device controlled from the outside. The valve consists of a diaphragm or membrane engaging an annular seat between a fluid inlet and a fluid outlet disposed on either side of said seat and on one side of the diaphragm of which the opposite face is responsive to a counter-pressure controlled by the bimetallic strip. A gaging device is provided, in addition, for so altering the position of the bimetallic strip that its operating temperature will correspond to the selected value by the position in which the external control means acting on the adjustment device is set.

In an apparatus of this type it is advantageous that the valve, the bimetallic strip and its adjustment device be mounted on a same and common block so that the resulting assembly may constitute a compact unit adapted to be mounted in or removed from the body through an aperture thereof, this aperture being normally closed by a cover through which extend the external means for controlling the adjustment device.

The essential feature of this invention consists in that the body of the apparatus comprises at least one fluid inlet nozzle of which the inner orifice registers with the body aperture so that the valve inlet may be connected in fluid-tight fashion to this orifice by simply closing the caver, due to the pressure exerted thereby.

It is another essential feature of this invention that the aforesaid gaging device comprises an actuating member adapted to be operated from outside the apparatus. Thus, the operating temperature of the bimetallic strip may be caused to correspond to the predetermined or preset position of the external means for controlling the adjustment device when the apparatus is in use.

The apparatus according to this invention is characterized, in comparison with existing devices, by the following advantages: the construction of its mechanism adapted to be disassembled as a single unit, is considerably simplified and the fitting of this mechanism in the body is much easier and requires no specific care; any deposits likely to accumulate in use on the inlet side of the valves will not interfere with the removal of the mechanism; and finally a complete, reliable fluid-tightness is obtained at the valve inlet.

It is a specific object of this invention to provide a thermostatic mixing cock which, when fed on the one hand with a hot fluid and on the other hand with a cold fluid, is adapted to deliver this fluid at a predetermined or preset temperature. The mixing cock comprises two inlet nozzles, one for the hot fluid and the other for the cold fluid, and a pair of valves each adapted to control the output of a separate inlet nozzle. According to this invention, the inlet orifices corresponding to the inlet nozzles respectively inside the body or case of the mixing cock are arranged in a common plane parallel to the plane of the aperture of said body or case.

In order to afford a clearer understanding of this invention and of the manner in which the same may be carried out in the practice, reference will now be made to the accompanying drawings forming part of this specification and illustrating diagrammatically by way of example a typical form of embodiment and a modified embodiment of a thermostatic mixing cock according to this invention.

In the drawings:

FIGURE 1 is a front view of one form of embodiment of a thermostatic mixing cock constructed according to the teachings of this invention, shown without its cover;

FIGURE 2 is a sectional view showing the same device with the cover fitted thereon the section being taken upon the line II—II of FIG. 1;

FIGURE 3 is a plan view from above showing the same form of embodiment of the device, the left-hand half of the figure being a section taken upon the line IIIg—IIIg of FIG. 2, and the right-hand half a section taken upon the line IIId—IIId of the same figure;

FIGURE 4 is a front view showing the mechanism of the apparatus which is adapted to be removed as a unitary block, the side shown in this figure being opposite to that shown in FIG. 1;

FIGURE 5 is a front and fragmentary view showing on a larger scale the details of the valve-controlling distributor means;

FIGURE 6 is a fragmentary view showing the inner face of the cover;

FIGURE 7 is a side view showing in axial section a modified embodiment of the thermostatic mixing cock according to this invention;

FIGURE 8 is an enlarged fragmentary view of the side face of the valve controlling distributor means.

Referring firstly to FIGS. 1, 2, and 3 of the drawings, the thermostatic mixing cock comprises a body or case 101 having a bottom 102 and a circular aperture 103. Adjacent to the bottom 102 are a pair of inlet nozzles 104d and 104g. Connected to the inlet nozzles 104d and 104g are a pair of inlet chambers forming an integral part of the body 101 and opening each into the inner space of the body through an inlet orifice 105d and 105g, respectively. The front faces 106d and 106g respectively of the inlet orifices 105d and 105g lie in a plane parallel to that of the aperture 103. Formed integrally with the backside 102 are a pair of bosses in which corresponding blind and tapped holes 108, 109 are formed and adapted to receive screws 118, 119 for securing a cover 110, for closing the aperture 103. When the cover 110 is secured, the main internal cavity of the case 101 constitutes a mixing chamber 200.

This cover 110 is formed with an integral inner annular projection 111 having an outer tapered surface adapted to engage a correspondingly shaped seat formed in the body 101. On the outer tapered surface of the annular projection 111 a peripheral groove adapted to receive a toroidal sealing gasket 112 is formed.

Projecting from the inner face of the cover 110 and inside the annular projection 111 are a central boss 113, a pair of perpendicular ribs 114, 115 and a pair of cylindrical bosses through which holes 116, 117 for the passage of the aforesaid screws 118, 119 respectively, are formed.

In an axial, central position the cover 110 has formed therein three aligned cylindrical holes of decreasing diameter 120, 121, 122 and a horizontal slot 123 opening into the inner face of the central boss 113. The hole 120 is tapped and surrounded by a cylindrical reinforcing annular lip projecting from the outer face of the cover; the tapped hole 120 is engaged by a threaded shouldered tubular and cylindrical member 124.

Overlying the holes 120, 121, 122 are three coaxial holes 127, 126 and 125 of decreasing diameter from the outside to the inside of the cover. The hole 127 is tapped and has screwed therein a cylindrical ring 128 and the hole 125 opens into the inner face of the central boss 113 (FIG. 6).

As shown in FIGS. 1 to 4 the mechanism of the mixing cock according to this invention constitutes a unitary block adapted to be removed as a single unit, and comprises a vertical plate 129 having formed on its lower portion a pair of integral cylindrical hollow bodies 130d, 130g; the axes of these bodies 130d, 130g extend at right angles to the plane of the plate 129.

The hollow body 130d is provided with an axial cavity, which opens oppositely to the plate 129 and which is formed with three bores of decreasing diameters from the outside to the inside, as shown at 131d, 132d, and 133d, respectively. The bore 132d is tapped and has screwed therein an externally and internally threaded ring 136d through which several circular concentric sets of spaced orifices 137d of relatively small diameter are formed, for example as shown in FIGS. 3 and 4. Provided with a central jet opening 146d and an antagonistic spring 150d, a diaphragm 145d is peripherally secured by the ring 136d against a shoulder formed at the opening of the bore 133d which is closed by a bottom wall 134d to constitute a chamber 135d. A funnel-shaped member 147d has a reduced diameter portion 148d which is screwed in the tapping of the ring 136d and a large diameter portion 149d on the opening of which is mounted a filter grid 151d bearing centrally a non-return flap 153d. A toroidal tight-joint 152d is interposed between the face 106d of the inlet orifice 105d and the opening of the funnel-shaped member 147d. Formed in the wall of the hollow body 130d is a radial aperture 138d, of which the length corresponds to that of the companion bore 131d.

The drawings show clearly that the hollow body 130g is symmetrical relative to the hollow body 130d described in the previous paragraph, and therefore the repetition of the latter is deemed unnecessary.

The gap between the two hollow bodies 130d, 130g constitutes a slot 140 and each chamber 135d, 135g communicates with this slot 140 through a straight passage 141d, 141g in which an axial-flow jet having an orifice 143d, 143g is fitted respectively. The jet orifices 143d, 143g open in face to face relationship into the slot 140, as clearly shown in FIG. 5.

In this slot 140 a rocker 154 adapted to oscillate between the jet orifices 143d and 143g is mounted on a pivot pin 204. In the thickness of the rocker 154 and on either side thereon a pair of transverse slots 202 and 203, respectively are formed so that when the rocker pivots towards the plate 129 it uncovers the jet orifice 143d by its slot 203 and obturates the jet orifices 143g and when it pivots in the opposite direction it uncovers the jet orifices 143g by its slot 204 and obturates the jet orifice 143d. In its intermediate position, the rocker uncovers both jet orifices.

The sensitive or heat-responsive element of the mixing cock is a thermostatic bimetallic strip 155 forming an integral part of the aforesaid mechanism adapted to be removed as a single unit. This bimetallic strip 155 has substantially the shape of an inverted J and carries on the end of its longer arm a ball 156 fitted in a U-shaped notch 205 formed in the upper end portion of the rocker 154. The shortest arm of the bimetallic strip is connected in a flexible manner to the upper portion of plate 129 by means of a mounting consisting of a substantially T-shaped spring blade 157, a rectangular distance-piece 158, a flat lever 159 and a pair of screws 160, 161. The blade 157 is secured by its upper arm to the plate 129. The upper end of the bimetallic strip 155 is clamped on the upper portion of the flat lever 159 formed with a depending extension, the screws 160, 161 extending through this assembly at right angles thereof and imparting the necessary rigidity to the assembly. Blind nuts 162, 163 are locked on the free ends of the two screws 160, 161.

Adjacent to the flat lever 159 is another flat lever 164 having formed through its upper portion a pair of elongated apertures 165, 166 through which extend the aforesaid screws 160, 161 with a clearance permitting the forward and backward tilting movement of the flat lever 164 of which the upper end is retained on the screws 160, 161 by the blind nuts 162, 163, as shown.

At its lower portion the flat lever 159 is formed with a central hole 167 registering with a tapped hole 168 formed in the other flat lever 164. A screw 169 extends freely through the hole 167, is screwed in the tapped hole 168 and as a spring blade is positioned between the two flat levers 159 and 164 which urges them away from each other, the screw 169 engaging with its head the edge of hole 167 makes it possible to adjust the relative spacing of the two flat levers 159, 164.

Now reference will be made to FIGS. 1, 2, and 3 to describe that portion of the adjustment device of the adjustment mechanism which is mounted on the cover 110. This portion of the adjustment device consists of a control shaft 170 and an adjustment member 171. The shaft 170 comprises a cylindrical head 172 of relatively large diameter and another portion 173 of relatively reduced diameter. Inside the shaft 170 and along the larger portion 172 thereof a tapped axial hole 174 is formed.

This head 172 fits in the hole 121 of cover 110 and is held therein by the shoulder formed by the lower face of member 124 screwed in the tapped hole 120 of cover 110. The adjustment member 171 consists of a screw-threaded portion 176 of reduced diameter, a portion 177 of larger diameter and a flattened inner portion 178. The screw-threaded portion 176 engages the tapped hole 174 of shaft 170. The larger portion 177 fits in the hole 122 of cover 110 and the flattened portion 178 extends through the slot 123 of this cover. The intermediate portion 177 has a peripheral groove formed therein which receives a sealing packing 175 of substantially toroidal configuration.

The portion 173 of reduced diameter of the control shaft 170 which projects form the outer face of the cover 110 is formed with a flat face and has threaded thereon a control knob 179 of which the axial hole fitting on this portion 173 is also formed with a flat side; a transverse or radial screw secures the control knob 179 on the shaft portion 173. At the same time, this control knob 179 acts as a movable dial of which the scale 180 may be read with reference to a stationary index 181 solid with the cover 110.

It is clear that the adjustment member 171, of which the threaded portion 176 engages the tapped hole 174 of control shaft 170 and of which the flattened portion 178 cannot rotate in the slot 123 of the cover, will move axially whenever the control knob 179 and therefore its shaft 170 are rotated in one or the other direction.

It will be noted that by construction the flattened portion 178 projects beyond the bearing plane of the cover 110 on the case 101 with a rigorously constant length depending on a predetermined setting position of the control knob 179, whereby the mixing block-mechanisms, which are precalibrated, may be interchanged between each other. However in particular use conditions it may be required to modify the calibration of these block-mechanisms.

Now then reference will be made to FIGS. 1, 3 and 6 to describe the gaging portion mounted on the cover 110. This portion consists of a cylindrical member 182 comprising an intermediate portion 183 of relatively larger diameter. One end of this member 182 constitutes a screw-driver 184 and its opposite end has formed therein a transverse slot 185. The member 182 extends through the holes 125, 126 and 127 of cover 110 and its larger portion 183 bears in a fluid-tight manner on the walls of the bore 126 by means of a toroidal packing ring 186. A coil spring 187 urges the aforesaid portion 183 against the shoulder formed by the inner face of the threaded ring 128 screwed in the tapped hole 125. The slotted end of member 182 projects outside the cover 110 of which the hole 127 is adapted to receive the other end of the member 182 which constitutes the screwdriver-like portion 184.

Formed in the plate 129 of the mechanism there is a rectangular aperture 188 adapted to permit the passage on the one hand of the flattened portion 178 of which the end engages the lower portion of the flat lever 164, and on the other hand of the member 182 of which the screwdriver-like portion 184 is adapted to actuate the screw 169 adjusting the relative spacing of the flat levers 159 and 164.

The operation of this thermostatic mixing cock will be readily understood. The nozzle 104d is connected to a source of cold fluid and the other nozzle 104g to a source of hot fluid. If the fluid flowing around the bimetallic strip 155 within the mixing chamber 200 is too hot, the strip 155 will be deformed and its end ball 156 will thus tilt the rocker 154 toward the plate 129. Thus, the jet orifice 143g is obturated and the hot fluid inlet is closed; at the same time, the other jet nozzle 143d is uncovered whereby causing the unseating of the membrane 145d and passing through the inlet orifice 105d the opening of the funnel-shaped member 147d, the orifice 137d and the radial aperture 138d, cold fluid enters the mixing chamber 200. Alternately, if the fluid flowing around the bimetallic strip 155 is too cold, the latter will cause the rocker 154 to pivot toward the backside 102, thus uncovering the jet orifice 143g and obturating the jet orifice 143d; under these conditions, the membrane 145g unseats and passing through the inlet orifice 105g, the openings of the funnel-shaped member 147g the orifices 137g and the radial aperature 138g, hot fluid enters the mixing chamber 200 while the cold fluid inlet is closed. Finally, if the fluid is at the desired temperature, the rocker is held in its intermediate position by the bimetallic strip. Then the two jet orifices are open upon simultaneous unseating of both membranes 145d and 145g and cold fluid and hot fluid are admitted into the mixing chamber 200 through the radial aperture 138d and 138g.

The operating temperature of the bimetallic strip 155 depends on the position from which this strip causes the rocker 154 to pivot in one or the other direction. This operating temperature may be adjusted by simply rotating the control knob 179 and its companion shaft 170 to cause the axial movement of the adjustment member 171. The end of the flattened portion 178 of control member 171 which engages the lower portion of the flat lever 164, causes the latter to pivot and therefore the bimetallic strip to tilt in one or the other direction according to the direction in which the control knob 179 was rotated. The pivotal movement of the flat lever 164 is transmitted to the bimetallic strip through the medium of the screws 160, 161 acting upon the spring blade 157. The scale 180 on knob 179 permits the proper identification of the operating temperature of this bimetallic strip 155 and therefore the selection of the dsired fluid temperature.

The gaging device of the thermostatic mixing cock according to this invention operates as follows.

The control knob 179 is removed from the control shaft 170 and a screwdriver engaged in the slot 185 of member 182; a pressure is exerted on this member until its screwdriver-like end 184 engages the slot of screw 169. It is then possible to rotate this screw in one or the other direction to vary the relative spacing of the flat levers 159 and 164. Thus, if the temperature of the fluid delivered by the mixing cock is lower than that indicated by the scale 180 of knob 179, the screw 169 will be rotated to reduce the relative spacing between the flat levers 159 and 164. On the other hand, the gap between these levers 159 and 164 will be increased if the temperature of the fluid is higher than that indicated by the scale 180.

To disassemble the mixing cock the control knob 179 is removed from the control shaft 170 and the cover 110 is taken out from the body 101 after loosening its fixation screws 118, 119; thus, the mechanism can easily be withdrawn by pulling the plate 129 outwards along the axis of the body 101. To re-assemble the device the same steps are followed but in the reverse order.

It will be noted that when the apparatus is in its assembled condition the inner edge of flange 111 and possibly the ribs 114, 115 of cover 110 bear against the plate 129. Thus, the force with which the cover-fastening screws are tightened is transmitted to the mechanism and consequently the latter is strongly pressed by the edges of the apertures of the funnel-shaped members 147d and 147g against the faces 106d and 106g of the inlet orifices 105d and 105g.

It will also be noted in connection with the adjustment device of the thermostatic mixing cock that the sealing packing 175 fitted in the groove of portion 177 of adjustment member 171 isolates from the fluid and from any foreign particles, substances or impurities possibly carried along by it the threaded portion 176 of member 171, as well as the tapped hole 174 of control shaft 170. Thus, the proper operation of the adjustment device is ensured.

In connection with the gaging device of the mixing cock it may be noted that the slotted end of member 171 projects from the outer face of cover 110 and constitutes an abutment member for the control knob 179 of the adjustment device.

It will be readily understood by anybody conversant with the art that many modifications may be brought to the specific form of embodiment shown and described herein, without departing however from the spirit and scope of the invention as set forth in the appended claims.

Thus, the centers of the two inlet orifices 105d and 105g within a body 101 of a mixing cock constructed in accordance with the teachings of this invention may be situated on a horizontal diameter of the body. In this case, the hollow bodies 130d and 130g are so disposed centrally of the plate 129 that the edge of the larger end of each funnel-shaped member 147d, 147g will bear against each front face 106d, 106g respectively of the orifices 105d, 105g. With this arrangement, the bimetallic strip 155 extends between the two hollow bodies 130d, 130g and the rocker 154 is mounted on a horizontal extension of the lower portion of plate 129. This modification is shown diagrammatically in FIG. 7.

In FIGURE 2, the case 101 is shown as provided with a lower outlet 201 which may be necessary for particular uses, whereas, in FIGURE 7 the case 101 is shown with a blow-off plug 206 according to the conventional practice.

On the other hand, any other suitable arrangement or design may be provided for the inner ribs of the detachable cover so that, for example, this cover bears only with the inner edge of its flange or on the plate of the adjustment mechanism when assembling or closing the apparatus. In this case the ribs act only as reinforcing elements.

Finally, it is evident that the present invention is applicable not only to thermostatic mixing cocks for hot and cold fluids but also to any thermostatic apparatus for thermally regulating a fluid by means of a bimetallic strip controlling any desired number of valves.

I claim:

1. Thermostatic mixing valve for hot and cold fluids, comprising a control mechanism detachable as a unit including a plate, an adjustable thermostatic bimetallic strip connected to said plate, a pair of fluid-regulating valves carried by said plate and each having a jet orifice and a slotted rocker pivotally connected to said plate, operatively connected to said bimetallic strip and positioned for controlling said fluid-regulating valve jet orifices, said strip, valve and rocker being connected to said plate as a unit, a hollow body housing said control mechanism providing a fluid mixing chamber around said control mechanism and having an open front, a detachable cover closing said body open front, a pair of inlet orifices formed with and extending within said body and each having a mouth front face lying in a plane parallel to that of said body open front, said valves each being detachably mounted in a fluid-tight manner on a different one of said orifice mouth front faces and means detachably retaining and tightly applying said cover on said body with said cover bearing against said plate retaining said valves on said orifice mouths in a seal-tight manner.

2. Thermostatic mixing valve for hot and cold fluids according to claim 1, characterized in that said pair of fluid regulating valves are provided by a pair of hollow bodies having said jet orifices and formed with and disposed on the same side of said plate, a pair of diaphragm valves and counter-pressure chambers mounted inside each of said hollow bodies, a pair of funnel-shaped members each mounted in one of said hollow bodies respectively so that the edge of the larger aperture of each funnel-shaped member bears around the edge of its corresponding orifice on the front face of said orifice and a pair of non-return valves mounted in each funnel-shaped member, and said thermostatic bimetallic strip is connected to said plate by one of its ends, and said rocker is connected to the opposite end of said bimetallic strip for establishing and releasing said counter-pressure in said chambers through said jet orifices respectively.

3. Thermostatic mixing cock according to claim 1, characterized in that said detachable cover is formed internally with at least one bearing surface adapted, when said cover is closed, to bear against said control mechanism plate so as to transmit the closing pressure of said cover thereto and said valve and a pair of resilient O rings are each mounted between one of said orifice mouth front faces and said valves being compressed by the pressure on said valves providing a seal between said valve and said orifices.

4. Thermostatic mixing cock according to claim 1, including a control for altering the operating temperature of said bimetallic strip comprising means mounted on said plate adjustably supporting said bimetallic strip, control members extending through said detachable cover and said plate, some of said members being movable about, and others along, their axes, said members being so interconnected that to each angular movement of the rotatable members there corresponds an axial displacement of the axially movable members to cause the displacement of said means adjustably supporting said bimetallic strip, and a control knob externally of said cover for actuating said rotatably movable members.

5. Thermostatic mixing cock according to claim 1, characterized in that a gaging device is provided for adjusting the operating temperature of said bimetallic strip which consists of a control member actuatable from the outside of said cover and slidably extending therethrough, and screw adjusted means supporting said bimetallic strip whose adjustment is controlled by said control member.

References Cited in the file of this patent

UNITED STATES PATENTS

| | | |
|---|---|---|
| 1,989,909 | Boydston | Feb. 5, 1935 |
| 2,199,129 | Hamilton | Apr. 30, 1940 |
| 2,237,720 | Waddell | Apr. 8, 1941 |
| 2,517,056 | Trubert | Aug. 1, 1950 |
| 2,780,412 | Holley | Feb. 5, 1957 |

FOREIGN PATENTS

| | | |
|---|---|---|
| 578,644 | Great Britain | July 5, 1946 |